United States Patent
Im

(10) Patent No.: US 10,832,114 B1
(45) Date of Patent: Nov. 10, 2020

(54) METHOD OF FREQUENCY PRE-TUNING OF EAS AND RFID LABELS FOR CURVED SURFACES

(71) Applicant: Bong Jin Im, Orinda, CA (US)

(72) Inventor: Bong Jin Im, Orinda, CA (US)

(73) Assignee: Bong Jim Im, Orinda, CA (US)

( * ) Notice: Subject to any disclaimer, the term of this patent is extended or adjusted under 35 U.S.C. 154(b) by 0 days.

(21) Appl. No.: 16/433,406

(22) Filed: Jun. 6, 2019

(51) Int. Cl.
*G06K 19/06* (2006.01)
*G06K 19/077* (2006.01)
*G06K 19/07* (2006.01)

(52) U.S. Cl.
CPC ..... *G06K 19/0772* (2013.01); *G06K 19/0723* (2013.01)

(58) Field of Classification Search
CPC ............. G06K 19/06046; G06K 19/07; G06K 17/0029
USPC ........ 235/492, 383, 462.46, 472.02
See application file for complete search history.

(56) References Cited

U.S. PATENT DOCUMENTS

| 7,336,243 | B2 * | 2/2008 | Jo | G06K 19/0726 340/572.7 |
| 7,967,204 | B2 * | 6/2011 | Hadley | G06K 19/07718 235/451 |
| 9,379,442 | B2 * | 6/2016 | Thomas | G06K 19/07766 |
| 9,634,735 | B2 * | 4/2017 | Koujima | H04B 5/0087 |
| 10,176,422 | B2 * | 1/2019 | Ennabli | H01Q 1/2225 |

* cited by examiner

*Primary Examiner* — Daniel St Cyr
(74) *Attorney, Agent, or Firm* — Plager Schack LLP

(57) ABSTRACT

A method of compensating for curvature effects to resonant frequency on pre-tuned planar-shaped EAS and RFID labels to apply to curve surfaces of Items. The method comprises obtaining width measurements of planar-shaped labels and radius measurements of Objects having curved external surfaces to which to apply the labels, and determines a subtending angle of a labels when applied to a curved external surface of an objects based on a quotient result of dividing the width measurement of a label along a perimeter of a curved external surface of the object and the radius measurement of the object.

9 Claims, 2 Drawing Sheets

METHOD OF FREQUENCY PRE-TUNING OF EAS AND RFID LABELS FOR CURVED SURFACES

BACKGROUND

Embodiments of the invention described in this specification relate generally to electronic article surveillance and radio frequency identification labels and systems, and more particularly, to a method of frequency pre-tuning of electronic article surveillance (EAS) and radio frequency identification (RFID) labels for curved surfaces.

An Electronic Article Surveillance (EAS) label or the Radio Frequency Identification (RFID) label is a flexible planar body, including a display surface or a protective layer on a top side and an electronic circuit on the bottom side. An adhesive coating is applied to the bottom of the flexible planar body, allowing the label to be adhered on a surface of an item.

The electronic circuit is designed to energize itself in the electromagnetic field excited at the resonant frequency determined by the electromagnetic characteristics of the circuit. Once the exciting energy level in the circuit reaches a certain level, the label emits electromagnetic, magnetic, or sonic signal. By detecting this emitted signal, the RFID system can identify the label and the EAS system can detect the presence of the label in the electromagnetic field.

Problems arise when a planar-shaped EAS or RFID label is adhered to a curved surface of an item. In particular, bending the label to accommodate the curved surface of the item alters the label's electromagnetic characteristics, including the resonant frequency and the inductance of the electronic circuit. The change in inductance adversely affects the performance of the label by reducing the detectable distance of the label. The change in resonant frequency blocks the electromagnetic field from energizing the label which either significantly reduces the detectable distance of the label or completely disables the function of the label.

Therefore, what is needed is a way of overcoming the problem of resonant frequency changes such that EAS and RFID labels can be affixed to curved surfaces and effectively used with EAS or RFID systems.

BRIEF DESCRIPTION

A novel method of frequency pre-tuning of electronic article surveillance (EAS) and radio frequency identification (RFID) labels for curved surfaces is disclosed. In some embodiments, the method of frequency pre-tuning of EAS and RFID labels for curved surfaces comprises compensating for curvature effects to resonant frequency on pre-tuned planar-shaped EAS and RFID labels to apply to curved surfaces of items. In some embodiments, the method of frequency pre-tuning of EAS and RFID labels for curved surfaces includes a plurality of steps comprising obtaining a width measurement of a planar-shaped label, obtaining a radius measurement of an object to which to apply the label, determining a subtending angle of the label when applied to the object based on the radius measurement of the object and the width measurement of the label along a perimeter of the object, using the subtending angle to determine change in resonant frequency caused by surface curvature of the object, and estimating the pre-tuned resonant frequency of the label in its planar shape.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel method of frequency pre-tuning of electronic article surveillance (EAS) and radio frequency identification (RFID) labels for curved surfaces. In some embodiments, the method of frequency pre-tuning of EAS and RFID labels for curved surfaces comprises compensating for curvature effects to resonant frequency on pre-tuned planar-shaped EAS and RFID labels to apply to curved surfaces of items. In some embodiments, the method of frequency pre-tuning of EAS and RFID labels for curved surfaces includes a plurality of steps comprising obtaining a width measurement of a planar-shaped label, obtaining a radius measurement of an object to which to apply the label, determining a subtending angle of the label when applied to the object based on the radius measurement of the object and the width measurement of the label along a perimeter of the object, using the subtending angle to determine change in resonant frequency caused by surface curvature of the object, and estimating the pre-tuned resonant frequency of the label in its planar shape. In some embodiments, the plurality of steps of the method of frequency pre-tuning of EAS and RFID labels for curved surfaces further includes using the estimated pre-tuned resonant frequency result for multiple planar-shaped labels to apply to multiple objects having the same subtending angle and radius. In some embodiments, the method of frequency pre-tuning of EAS and RFID labels for curved surfaces estimates the pre-tuned resonant frequency of the label in its planar shape by subtracting the change in resonant frequency caused by the surface curvature from a target frequency when the label is applied to the object. Target frequency in this specification is also referred to as a desired frequency or an intended frequency.

As stated above, problems arise when a planar-shaped electronic article surveillance (EAS) or radio frequency identification (RFID) label is adhered to a curved surface of an item. In particular, bending the label to accommodate the curved surface of the item alters the label's electromagnetic characteristics, including the resonant frequency and the inductance of the electronic circuit. The change in inductance adversely affects the performance of the label by reducing the detectable distance of the label. The change in resonant frequency blocks the electromagnetic field from energizing the label which either significantly reduces the detectable distance of the label or completely disables the function of the label.

Figure 1:
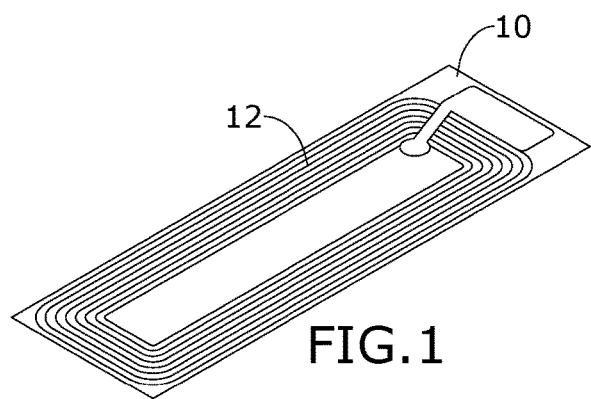
FIG. 1 conceptually illustrates an example of a conventional planar-shaped electronic article surveillance (EAS) label.

By way of example, FIG. 1 conceptually illustrates a prior art example of a planar-shaped electronic article surveillance (EAS) label 10. The planar-shaped EAS label 10 shown in this figure includes an electronic circuit 12 that has a resonant frequency.

Embodiments of the method described in this specification solve such problems by overcoming the problem of natural frequency changes such that the EAS label can be affixed to a curved surface and effectively used with EAS or RFID systems. Accordingly, the method opens up the way of manufacturing labels in their planar form with a pre-tuned resonant frequency. As a result, pre-tuned EAS labels can be applied on items with curved surfaces. Examples of items with curved surfaces include, without limitation, pencils, lipstick, fingernail articles for manicures and so forth, eyeliners, etc. This is possible because the method ensures that when the pre-tuned label bends to accommodate the curved surface, the resonant frequency characteristic of the EAS label or RFID label will change back to match the electromagnetic field frequency of the EAS system or RFID system, respectively.

Figure 2:
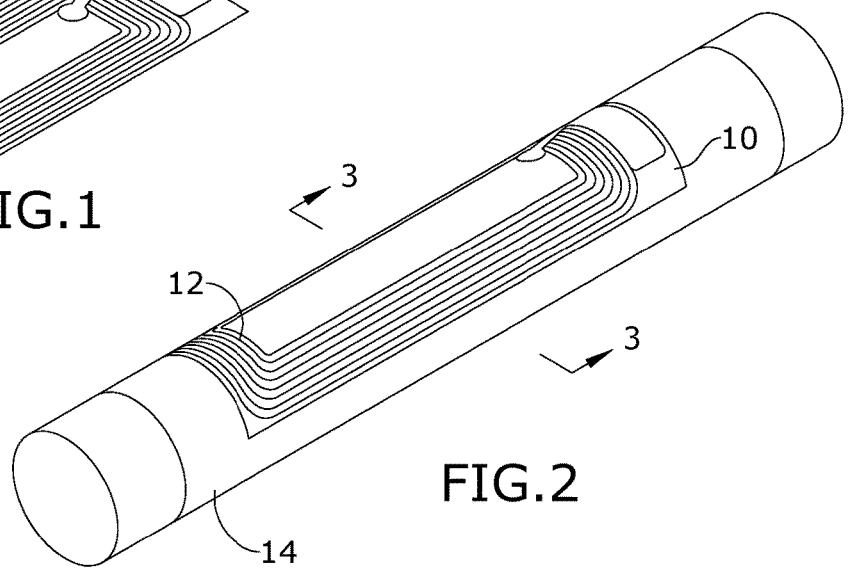
FIG. 2 conceptually illustrates a pre-tuned curved EAS label in some embodiments when applied to an object.

By way of example, FIG. 2 conceptually illustrates the planar-shaped EAS label 10 when applied to an object 14 with a curved surface. As shown in this figure, when the planar-shaped EAS label bends to adhere to the curved surface of the object 14, the electronic circuit 12 bends in a way that could reduce the detectable distance of the EAS label 10 or render the EAS label 10 non-functioning because the electronic circuit 12 cannot be energized due to the change in resonant frequency, and therefore, the blocking of the electromagnetic field. However, when appropriately pre-tuned to compensate for the change in resonant frequency, the EAS label 10 can be applied to the curved surface of the object 14 in a manner that effectively maintains the electromagnetic characteristics of the EAS label 10, namely, resonant frequency and inductance. The line 3-3 shown in this figure provides a reference (in relation to FIG. 3, which is described in greater detail below) that demonstrates how to compensate for the change in resonant frequency when the EAS label 10 is applied to the curved surface of the object 14.

Embodiments of the method described in this specification differ from and improve upon conventional EAS and RFID labels, systems, and other options for applying pre-tuned labels to curved surfaces. In particular, the performance degradation with the curving angle is determined by means of electromagnetic analysis, which focuses on the antenna gain, resistance, and reactance changes with varying curving angles. This suggests that the detecting distance is a parameter for the tag performance. However, it does not consider the resonant frequency as a parameter and does not address any ways to overcome the tag degradation due to the curving angle. In contrast, some embodiments of the method of the present disclosure overcomes tag degradation when curved angles are involved by compensating for the change in resonant frequency experienced when the EAS label is applied or adhered to the curved surface of the article.

Figure 3:
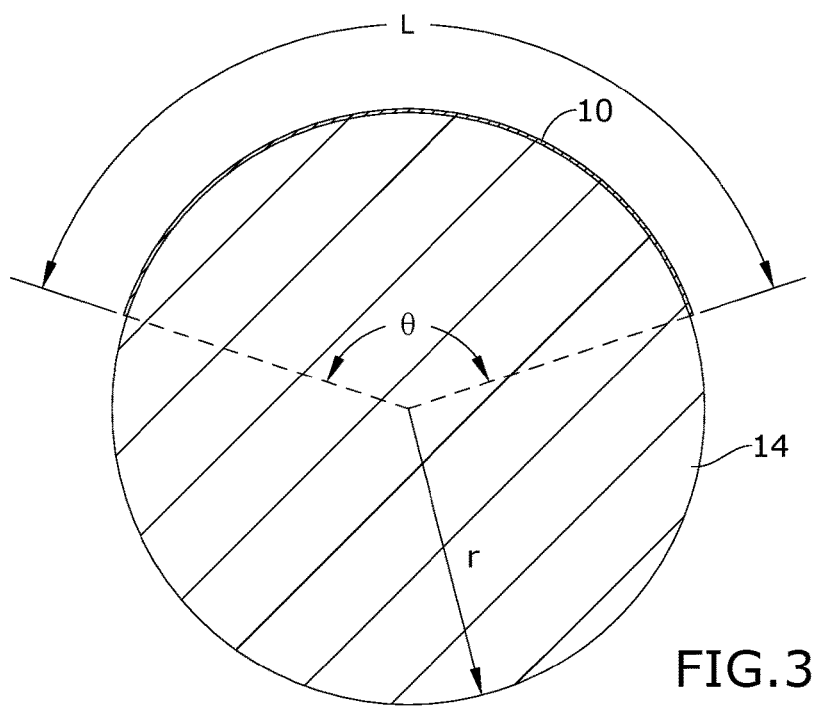
FIG. 3 conceptually illustrates a section view of the pre-tuned curved EAS label taken along line 3-3 as shown in FIG. 2, and showing dimensions for calculating a subtending angle of the conventional planar-shaped EAS label shown in FIG. 1.

In some embodiments of the method, the resonant frequency change with respect to the surface curvature of an item is formulated, as demonstrated by reference to FIG. 3. Specifically, FIG. 3 conceptually illustrates a section view of the object 14 with the curved surface, taken along line 3-3 as shown in FIG. 2, to which the pre-tuned label 10 is applied and shows dimensions for calculating a subtending angle of the label 10 shown in FIG. 1. Specifically, as shown in this figure, a major parameter is the subtending angle ($\theta$) that is determined by the label width (L) of the label 10 along the perimeter of the circular object 14 and the radius (r) of the object 14. Their relation is expressed by the following equation:

$$\theta = L/r \qquad \text{(Eq. 1)}$$

In addition, when $f_{planar}$ represents the resonant frequency of a label in planar shape (altered frequency), $f_{curved}$ represents the resonant frequency of a label in a curved shape, and $\Delta f$ represents the resonant frequency change due to the curvature of the label, then the pre-tuned resonant frequency of a planar-shaped label, $f_{planar}$, can be estimated for any amount of curvature, as expressed in the following equation:

$$f_{planar} = f_{curved} - \Delta f \qquad \text{(Eq. 2)}$$

Figure 4:
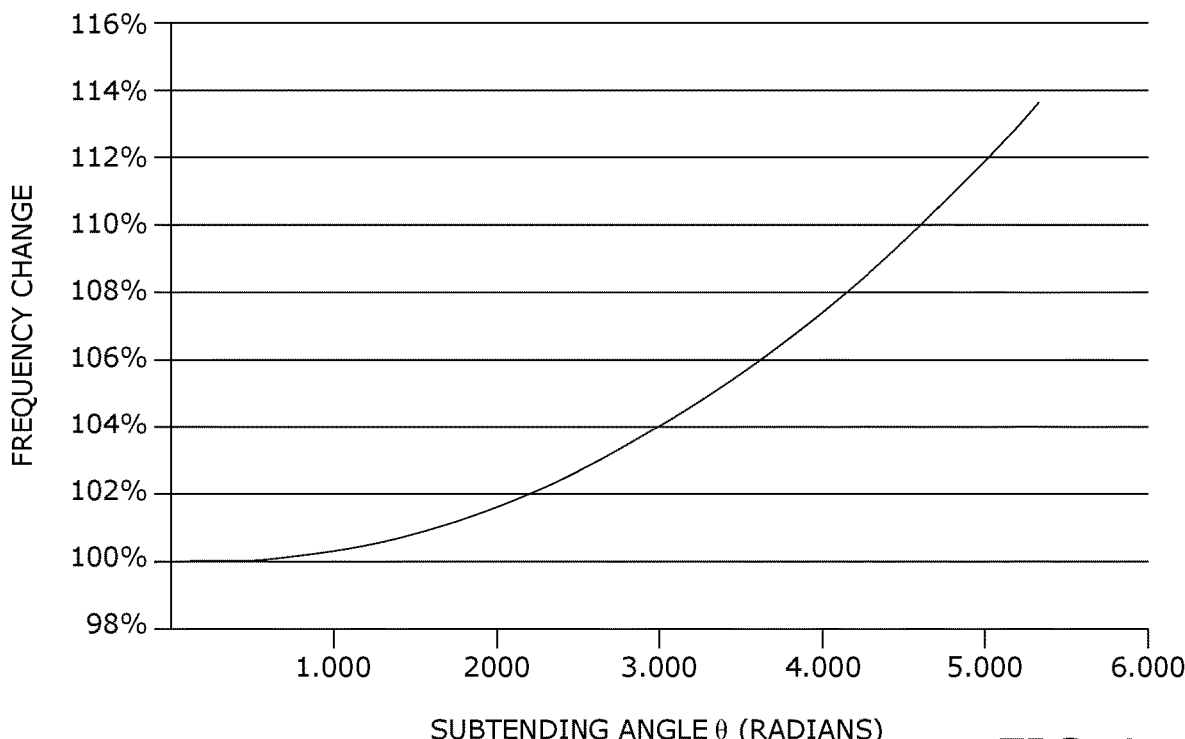
FIG. 4 conceptually illustrates a graph showing the change in resonant frequency in relation to the subtending angle.

By way of example, FIG. 4 conceptually illustrates a graph showing the change in resonant frequency, $\Delta f$, in relation to the subtending angle, $\theta$. As shown in this figure, the resonant frequency change, $\Delta f$, which is a function of the subtending angle, is empirically determined and illustrated as a percentage that increases non-linearly as the number of radians of the subtending angle, $\theta$, increases. Thus, the greater the subtending angle, the greater the frequency change will occur.

The method of frequency pre-tuning of EAS and RFID labels for curved surfaces of the present disclosure may be comprised of the following steps and elements. This list of possible steps and elements is intended to be exemplary only and it is not intended that this list be used to limit the method of the present application to just these steps or elements.

1. Obtaining a width measurement of a planar-shaped label
2. Obtaining a radius measurement of an object to which to apply the label
3. Determining a subtending angle of the label when applied to the object based on the radius measurement of the object and the width measurement of the label along a perimeter of the object
4. Using the subtending angle to determine change in resonant frequency caused by surface curvature of the object
5. Estimating the pre-tuned resonant frequency of the label in its planar shape (by subtracting the change in resonant frequency caused by the surface curvature from a target frequency when the label is applied to the object target frequency, desired frequency, intended frequency, etc.)

6. Then the method ends. Can now use for multiple planar-shaped labels to apply to multiple objects having the same subtending angle and radius (i.e., pre-tuning a plurality of planar-shaped labels to the estimated pre-tuned resonant frequency to consistently have the target resonant frequency when applied)

The method of the present disclosure generally works by performing the above-listed steps, or by performing operations or actions that are spelled out in the above-listed steps. In this way, the pre-tuned resonant frequency of a label, $f_{planar}$, can be estimated. For example, a person can perform the following steps to estimate the pre-tuned resonant frequency, $f_{planar}$. First, with the given dimensions of the label width applied to the curved surface (L) and the radius (r) of the object, the subtending angle (θ) can be found according the first equation (Eq. 1) noted above. Next, using the graph (such as the graph described above by reference to FIG. 4), the resonant frequency change, Δf, can be obtained at any given target frequency, $f_{curved}$. Finally, the pre-tuned frequency, $f_{planar}$, can be estimated according to the second equation (Eq. 2) noted above.

Figure 5:
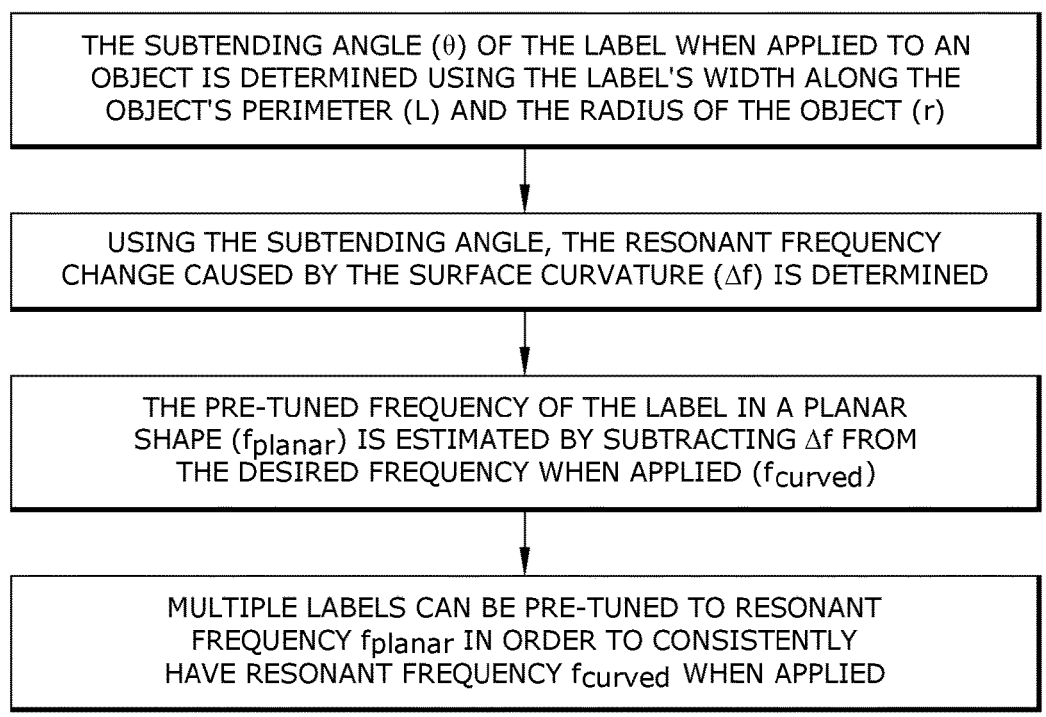
FIG. 5 conceptually illustrates a method of frequency pre-tuning of EAS and RFID labels for curved surfaces in some embodiments.

By way of example, FIG. 5 conceptually illustrates a method of frequency pre-tuning of EAS and RFID labels for curved surfaces. As shown in this figure, the method of compensating for curvature effects to resonant frequency on pre-tuned planar-shaped EAS and RFID labels includes a plurality of steps to estimate the pre-tuned resonant frequency, $f_{planar}$. First, the subtending angle (θ) of the label when applied to an object (with a curved surface) is determined using the label's width along the object's perimeter (L) and the radius (r) of the object. The second step of the method of compensating for curvature effects to resonant frequency on pre-tuned planar-shaped EAS and RFID labels shown in this figure includes determining the resonant frequency change, Δf, by using the subtending angle (θ). During the third step, the pre-tuned resonant frequency of the label in a planar shape, $f_{planar}$, is estimated by subtracting the resonant frequency change, Δf, from the desired frequency when applied, $f_{curved}$ Finally, multiple labels can be pre-tuned to resonant frequency, $f_{planar}$, in order to consistently have resonant frequency, $f_{curved}$, when applied.

A constraint exists in some embodiments of the method. In some embodiments, the constraint limits the resonant frequency of the curved label ($f_{curved}$) to be within the range of electromagnetic field frequency provided by the EAS system or the RFID system. Otherwise the label attached on a curved surface would not be energized and detected by the EAS system or the RFID system.

The results of the method open the way for manufacturing of EAS and RFID labels in planar form with a pre-tuned resonant frequency. As such, pre-tuned labels can be applied on items with curved surfaces such as, pencils, pens, dowels, poles and circular handles, cosmetics casings (e.g., lipstick, etc.), etc. As they bend to accommodate the curved surface, their resonant frequency will change to match the electromagnetic field frequency of the EAS or RFID system.

Also, empirical results have demonstrated the method's effectiveness. Specifically, demonstrated results have been obtained by testing pre-tuned EAS labels that were manufactured for actual testing. Two different pre-tuning frequencies were used for two subtending angles. The pre-tuned EAS labels were attached on cylindrical objects with different diameters. The tests showed that the pre-tuned labels achieve the target frequency ($f_{curved}$) and were properly energized and detected by the EAS system.

To make the method of frequency pre-tuning of EAS and RFID labels for curved surfaces of the present disclosure, a person would utilize the method in connection with exiting manufacturing facilities for EAS or RFID labels. The antenna pattern may be redesigned to achieve greater overlap of pre-tuned resonant frequencies.

By using the method of the present disclosure in connection with manufacturing of EAS or RFID lables, it is possible to overcome the problem of resonant frequency changes such that EAS and RFID labels can be affixed on curved surfaces and effectively used with EAS or RFID systems.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method of frequency pre-tuning of electronic article surveillance (EAS) and radio frequency identification (RFID) labels for curved surfaces, said method comprising:
   obtaining a width measurement of a planar-shaped label;
   obtaining a radius measurement of an object having a curved external surface to which to apply the label;
   determining a subtending angle of the label when applied to the curved external surface of the object based on a quotient result of dividing the width measurer of the label along a perimeter of the curved external surface of the object and the radius measurement of the object;
   using the subtending angle to determine a change in resonant frequency caused by, surface curvature of the object; and
   estimating an upward shift in resonant frequency needed to pre-tune resonant frequency of the label in its planar shape so that the resonant frequency of the label when applied to the curved external surface of the Object is tuned to a target frequency of a system in which he label operates.

2. The method of frequency pre-tuning of EAS and RFID labels for curved surfaces of claim 1 further comprising using the estimated upward shift in resonant frequency to pre-tune resonant frequency of the label in its planar shape to manufacture a plurality of electrically pre-tuned planar-shaped labels intended for application to a plurality of different objects that are made of differing materials with the same subtending angle and radius.

3. The method of frequency pre-tuning of EAS and RFID labels for curved surfaces of claim 1, wherein estimating the upward shift in resonant frequency needed to pre-tune resonant frequency of the label in its planar shape comprises subtracting the change in resonant frequency caused by the surface curvature from the target frequency when the label is applied to the object.

4. The method of frequency pre-tuning of EAS and RFID labels for curved surfaces of claim 3, wherein the planar-shaped label comprises an electronic article surveillance (EAS) label that works in connection with an EAS system.

5. The method of frequency pre-tuning, of EAS and RFID labels for curved surfaces of claim 4, wherein the target frequency comprises a frequency within a range of electromagnetic field frequency provided by the EAS system.

6. The method of frequency pre-tuning of EAS and RFID labels for curved surfaces of claim 3, wherein the planar-shaped label comprises a radio frequency identification (RFID) label that works in connection with an RFID system.

7. The method of frequency pre-tuning of EAS and RFID labels for curved surfaces of claim 6, wherein the target frequency comprises a frequency within a range of electromagnetic field frequency provided by the RFD system.

8. The method of frequency pre-tuning of EAS and RFID labels for curved surfaces of claim 1, wherein the subtending angle is measured by a number of radians.

9. The method of frequency pre-tuning of EAS and RFID labels for curved surfaces of claim 1, wherein the planar-shaped label includes an electronic circuit that is inductively energized in the electromagnetic field when resonant frequency of the electronic circuit on the planar-shaped label is tuned to the target frequency of the system in which the planar-shaped label operates, wherein the electromagnetic field is blocked by a change in resonant frequency due to bending the a non-electrically pre-tuned planar-shaped label for application to a curved surface without compensating for the change in resonant frequency.

\* \* \* \* \*